United States Patent
Peng et al.

(10) Patent No.: US 12,410,082 B2
(45) Date of Patent: Sep. 9, 2025

(54) METHOD FOR TREATING MIDDLE AND MATURE LANDFILL LEACHATE BY ENDOGENOUS DENITRIFICATION COMBINED AUTOTROPHIC NITROGEN REMOVAL PROCESS

(71) Applicant: BEIJING UNIVERSITY OF TECHNOLOGY, Beijing (CN)

(72) Inventors: Yongzhen Peng, Beijing (CN); Haoran Liang, Beijing (CN); Xiyao Li, Beijing (CN); Zhong Wang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 50 days.

(21) Appl. No.: 17/919,919

(22) PCT Filed: Oct. 29, 2021

(86) PCT No.: PCT/CN2021/127401
§ 371 (c)(1),
(2) Date: Oct. 19, 2022

(87) PCT Pub. No.: WO2022/242040
PCT Pub. Date: Nov. 24, 2022

(65) Prior Publication Data
US 2024/0208846 A1    Jun. 27, 2024

(30) Foreign Application Priority Data

May 20, 2021   (CN) .......................... 202110548792.6

(51) Int. Cl.
*C02F 3/30*    (2023.01)
*C02F 103/06*    (2006.01)

(52) U.S. Cl.
CPC .......... *C02F 3/307* (2013.01); *C02F 2103/06* (2013.01); *C02F 2209/06* (2013.01)

(58) Field of Classification Search
CPC .................................. C02F 3/307; C02F 3/30
(Continued)

(56) References Cited

FOREIGN PATENT DOCUMENTS

| CN | 102515350 A | 6/2012 |
|---|---|---|
| CN | 202492432 U | 10/2012 |

(Continued)

OTHER PUBLICATIONS

Wang et al, CN 105347476 A, English machine translation, pp. 1-4 (Year: 2016).*

(Continued)

*Primary Examiner* — Claire A Norris
(74) *Attorney, Agent, or Firm* — Maschoff Brennan

(57) ABSTRACT

A method for treating middle and mature landfill leachate by endogenous denitrification combined autotrophic nitrogen removal process, which belongs to a field of biological treatment of high-ammonia-nitrogen wastewater. The middle and mature landfill leachate firstly enters a PN/ED-SBR reactor to perform in an A/O (anaerobic/aerobic) mode, microorganisms in an anaerobic stage absorb an external carbon source and store the external carbon source as an intracellular carbon source, partial nitrification is performed in the aerobic stage, and the ammonia nitrogen in inlet water is completely oxidized into nitrite nitrogen; after the reaction is finished, an effluent containing nitrite nitrogen and middle and mature landfill leachate are mixed and then enter an AMOX-UASB reactor to perform anammox reaction, the effluent of the reactor is pumped into the PN/ED-SBR reactor again to perform in the anoxic mode, and oxidized nitrogen is removed through endogenous denitrification.

2 Claims, 1 Drawing Sheet

(58) Field of Classification Search
USPC .......................................................... 210/605
See application file for complete search history.

(56) References Cited

FOREIGN PATENT DOCUMENTS

| | | | |
|---|---|---|---|
| CN | 104961305 A | | 10/2015 |
| CN | 105347476 A | * | 2/2016 |
| CN | 113233597 A | | 8/2021 |
| KR | 10-2017-0040900 A | | 4/2017 |

OTHER PUBLICATIONS

CN Office Action dated Jan. 4, 2022 as received in Application No. 202110548792.6.
International Search Report and Written Opinion of the International Searching Authority dated Feb. 15, 2022 as received in Application No. PCT/CN2021/127401.

* cited by examiner

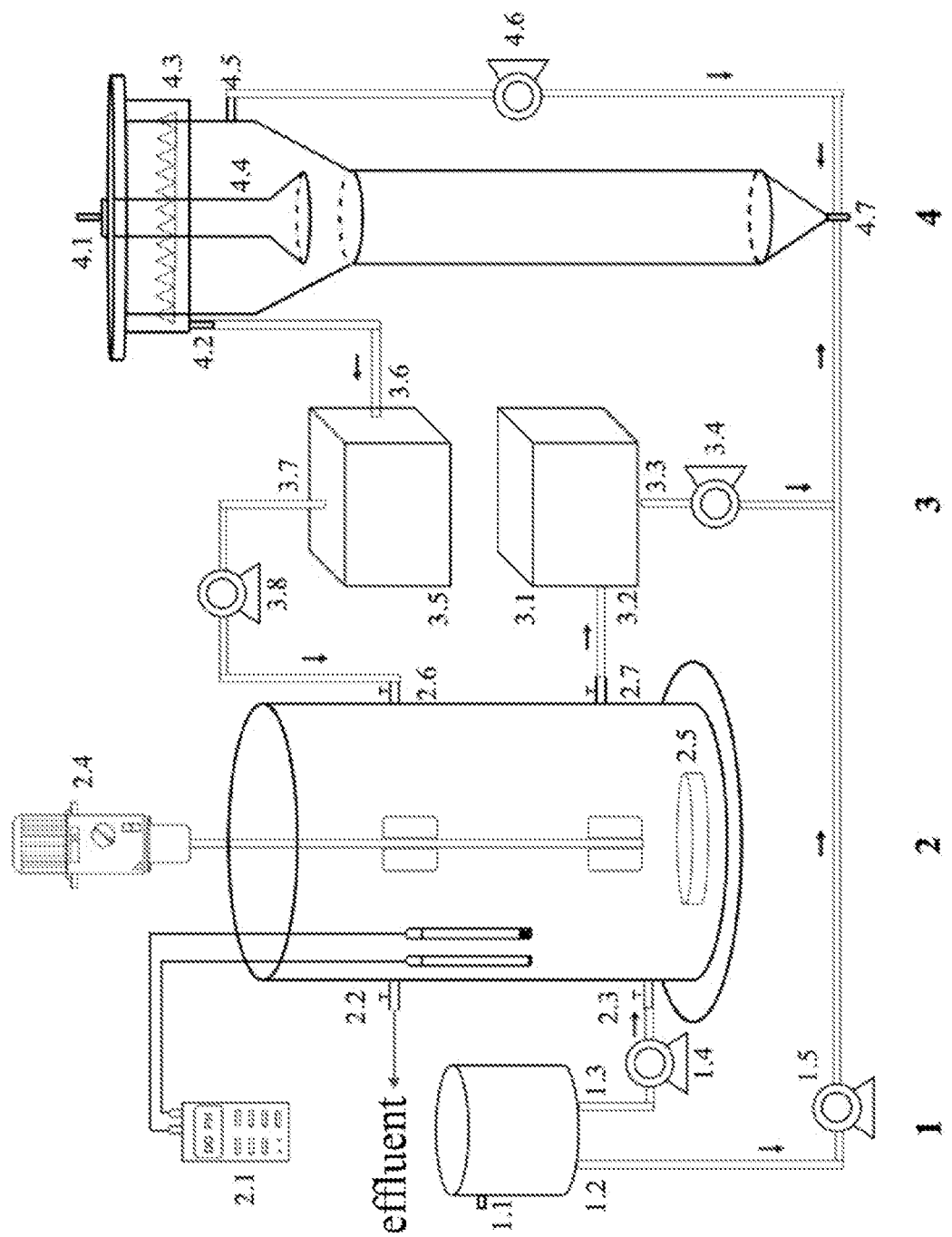

METHOD FOR TREATING MIDDLE AND MATURE LANDFILL LEACHATE BY ENDOGENOUS DENITRIFICATION COMBINED AUTOTROPHIC NITROGEN REMOVAL PROCESS

TECHNICAL FIELD

The present application belongs to a technical field of biological nitrogen removal of high ammonia nitrogen wastewater, and specifically relates to a method for treating middle and mature landfill leachate by endogenous denitrification combined autotrophic nitrogen removal process to achieve a high-efficiency and advanced nitrogen removal.

BACKGROUND

In recent years, with the acceleration of urbanization in Chinese country and the continuous improvement of the quality of residents living, the output of municipal solid waste is increasing year by year. Traditional methods for treating waste include landfill, incineration, and composting. Wherein the landfill method has gradually become the most widely used treatment and disposal method in the world due to its simple operation mode. The waste to be landfilled is initially treated and transported to the landfill site, and the organic matter is decomposed by bacteria under anaerobic conditions to produce water. The high-polluting wastewater generated by precipitation, surface water influx and its own water is the landfill leachate. The landfill leachate is a kind of wastewater containing high concentration of organic matters and ammonia nitrogen and having the characteristics of complex water quality constituents, large changes in water volume, imbalanced ratio of microbial nutrient elements and large fluctuations in changes of water quality with the landfill years, etc., which will cause serious pollution to the environment and make the treatment of the landfill leachate one of unsolved problems with an international scope.

Traditional wastewater biological nitrogen removal converts ammonia nitrogen ($NH_4^+$—N) into nitrate nitrogen ($NO_3^-$—N) through nitrification, and then converts nitrate nitrogen ($NO_3^-$—N) into nitrogen ($N_2$) to escape from water through denitrification. In the denitrification stage, microorganisms use nitrate nitrogen ($NO_3^-$—N) as an electron acceptor and organic matters as an electron donor, finally ammonia nitrogen is converted into nitrogen, and nitrogen removal is finished. However, for the middle and mature landfill leachate, its ammonia nitrogen concentration is extremely high, biodegradable organic matter is low, and the composition is complex and the carbon-nitrogen ratio is low. On the basis of the traditional nitrification and denitrification biological nitrogen removal technology, the carbon source of the landfill leachate is far from sufficient, and a large amount of external carbon source is required for nitrogen removal, which results in low efficiency and high operating cost for treating the middle and mature leachate nitrogen removal.

Partial nitrification, anammox and endogenous denitrification technologies are relatively fast-developed new wastewater biological treatment technologies in recent years, which have great application value and broad development prospects. Partial nitrification is that ammonia oxidization bacteria oxidize ammonia nitrogen into nitrite nitrogen under aerobic conditions. Compared with traditional nitrification, partial nitrification has the advantages of saving aeration volume, saving energy, and reducing residual sludge. Anammox technology is a process that anammox bacteria convert ammonia nitrogen and nitrite nitrogen in wastewater into nitrogen and a small amount of nitrate nitrogen at the same time under anoxic conditions. And anammox technology is an autotrophic nitrogen removal technology, which has the advantages of saving carbon source, reducing cost, and low sludge output. Endogenous denitrification technology is that endogenous denitrification bacteria, under anaerobic conditions, temporarily store the external carbon source in the raw water in the form of intracellular carbon source and use the intracellular carbon source to perform endogenous denitrification to remove nitrogen during anoxic condition, which has the advantage of temporarily storing carbon sources to avoid waste of some carbon sources in the aerobic stage.

An apparatus for treating middle and mature landfill leachate by partial nitrification/anammox/endogenous denitrification process, which combines these three new technologies through PN/ED-SBR and AMOX-UASB two-stage reactors to treat middle and mature landfill leachate. The middle and mature landfill leachate first enters the PN/ED-SBR reactor operating in an anaerobic/aerobic mode, the microorganisms in the anaerobic stage absorb external carbon sources and store them as intracellular carbon sources and the partial nitrification is performed in the aerobic stage, and the ammonia nitrogen in influent is all oxidized to nitrite nitrogen; after the reaction, the effluent containing nitrite nitrogen is mixed with the middle and mature landfill leachate and then enters the AMOX-UASB reactor to perform anammox reaction, and the effluent of the reactor is re-pumped to enter the PN/ED-SBR reactor performing in anoxic mode, and its oxidized nitrogen is removed by endogenous denitrification. Under the conditions that the ammonia nitrogen, total nitrogen and COD concentration in influent are 1350±45 mg/L, 1425±60 mg/L and 2600±150 mg/L respectively, and the TN in effluent <65 mg/L, the removal rate reaches 95.5%, and the TN removal load reaches 0.73 kg/($m^3$·d).

SUMMARY

The present application provides a method for treating middle and mature landfill leachate by endogenous denitrification combined autotrophic nitrogen removal process aiming at the problems of low treatment efficiency and high cost of middle and late landfill leachate. Specifically, the middle and mature landfill leachate first enters the PN/ED-SBR performing in A/O (anaerobic/aerobic) mode, after the raw water enters an anaerobic stage, microorganisms absorb an external carbon source in raw water and store it as an intracellular carbon source; after entering an aerobic stage, a partial nitrification reaction occurs, and the ammonia nitrogen in the mixed solution of the reactor is completely oxidized into nitrite nitrogen; after the reaction, the effluent containing nitrite nitrogen and the middle and mature landfill leachate are mixed and then enter the AMOX-UASB reactor for the anammox reaction, the effluent is re-pumped into the PN/ED-SBR reactor performing in anoxic mode, and oxidized nitrogen therein is removed by endogenous denitrification. In the case of limited organic matter in the middle and late landfill leachate, microorganisms store part of the organic matter in the cells in time. After the wastewater undergoes anaerobic ammonia oxidation to reduce the total nitrogen load, the internal carbon source is used for denitrification to remove nitrogen in the subsequent anoxic stage, and the advanced nitrogen removal of the middle and mature landfill leachate is realized.

The present application is realized through the following technical solutions:

A method for treating middle and mature landfill leachate by endogenous denitrification combined autotrophic nitrogen removal process, comprising a raw water tank (1), a partial nitrification and endogenous denitrification sequencing batch reactor (PN/ED-SBR) (2), a middle water tank (3), and an anammox reactor (AMOX-UASB) (4);

wherein the raw water tank is provided with a first water inlet (1.1), a first water outlet (1.2), a second water outlet (1.3), a first water inlet peristaltic pump (1.4), and a second water inlet peristaltic pump (1.5); the PN/ED-SBR (2) is provided with a pH/DO real-time monitoring device (2.1), a third water outlet (2.2), a second water inlet (2.3), a mixer (2.4), an aeration plate (2.5), a third water inlet (2.6), and a fourth water outlet (2.7); the middle water tank (3) is provided with a first middle water tank (3.1), a fourth water inlet (3.2), a fifth water outlet (3.3), a third water inlet peristaltic pump (3.4), a second middle water tank (3.5), a fifth water inlet (3.6), a sixth water outlet (3.7), and a fourth water inlet peristaltic pump (3.8); the AMOX-UASB (4) is provided with an exhaust port (4.1), a seventh water outlet (4.2), an overflow weir (4.3), a three-phase separator (4.4), a return port (4.5), a return peristaltic pump (4.6), and a sixth inlet nozzle (4.7);

wherein the first water outlet (1.2) of the raw water tank (1) is connected to the sixth water inlet (4.7) of AMOX-UASB (4) through the second water inlet peristaltic pump (1.5); the second water outlet (1.3) of the raw water tank (1) is connected to the second water inlet (2.3) of PN/ED-SBR (2) through the first water inlet peristaltic pump (1.4); the fourth water outlet (2.7) of PN/ED-SBR (2) is connected to the fourth water inlet (3.2) of the first middle water tank (3.1); the fifth water outlet (3.3) of the first middle water tank (3.1) is connected to the sixth water inlet (4.7) of the AMOX-UASB (4) through the third water inlet peristaltic pump (3.4); the return port (4.5) of the AMOX-UASB (4) is connected to the sixth water inlet (4.7) through the return peristaltic pump (4.6); the AMOX-UASB (4) is connected to the fifth water inlet (3.6) of the second middle water tank (3.5); the sixth water outlet (3.7) of the second middle water tank (3.5) is connected to the third water inlet (2.6) of the PN/ED-SBR (2) through the fourth water inlet peristaltic pump (3.8).

The method for treating middle and mature landfill leachate by endogenous denitrification combined autotrophic nitrogen removal process, comprising the following processes:

1) adding partial nitrification activated sludge and endogenous denitrification activated sludge into the partial nitrification and endogenous denitrification integrated reactor (PN/ED-SBR) (2) with a mass ratio of 1:2, and adding an anammox sludge into the anammox reactor (AMOX-UASB) (4), wherein the concentration of the mixed liquid sludge in the two reactors after the addition is controlled at 4000-6000 mg/L and 8000-15000 mg/L respectively;

2) turning on the first water inlet peristaltic pump (1.4), and pumping the middle and late landfill leachate in the raw water tank (1) into the PN/ED-SBR (2) which is performed in A/O (anaerobic/aerobic) mode comprising after water inflow is completed, turning on the mixer (2.4) for entering an anaerobic stage, endogenous denitrification bacteria absorb exogenous organic matter in raw water and store it in cells as an internal carbon source, mixing for 4 h, and closing the mixer (2.4); and then starting aeration through the aeration plate (2.5), monitoring changes of DO and pH through the pH/DO real-time control device (2.1), controlling DO between 1.5-2.5 mg/L, and stopping aeration before an inflection point of a curve that shows the pH in the reactor during the nitrification process firstly descends and then rises, that is, "ammonia valley point"; performing sedimentation 1 h to separate a muddy water, opening the fourth water outlet (2.7), and draining the water into the first middle tank (3.1) with a drainage ratio of 70%;

3) turning on the second water inlet peristaltic pump (1.5) and the third water inlet peristaltic pump (3.4) respectively, and pumping the middle and mature landfill leachate in the raw water tank (1) and wastewater containing nitrite nitrogen in the first middle water tank (3.1) into the AMOX-UASB (4) at the same time to perform an anammox reaction; wastewater of the AMOX-UASB (4) enters the sixth water inlet (4.7) from the return port (4.5) through the return peristaltic pump (4.6) with a return ratio of 200%; and an effluent of the AMOX-UASB (4) enters the second middle water tank (3.5);

4) turning on the fourth water inlet peristaltic pump (3.8), re-pumping the wastewater containing nitrite nitrogen of the second middle water tank (3.5) into the PN/ED-SBR (2), turning on the mixer (2.4) for entering an anoxic stage, and performing internal source denitrification to remove nitrogen, mixing for 6 h, after anoxic stage, closing the mixer (2.4) for precipitation for 0.5 h to separate the muddy water, opening the third outlet (2.2), and discharging the treated wastewater with a drainage ratio of 10%.

Technical Principle

A method for treating middle and mature landfill leachate by endogenous denitrification combined autotrophic nitrogen removal process, wherein the middle and mature landfill leachate first enters the PN/ED-SBR reactor and performs in an A/O (anaerobic/aerobic) mode. The endogenous denitrification bacteria in the aerobic stage absorb the external carbon source and store it in cells as an internal carbon source. Partial nitrification occurs in the aerobic stage, and ammonia oxidization bacteria oxidizes all the ammonia nitrogen in the influent to nitrite nitrogen; after the reaction is completed, the effluent containing nitrite nitrogen and the middle and mature landfill leachate are mixed according to a certain ratio into the AMOX-UASB reactor for anammox reaction. The reactor produces effluent containing a small amount of nitrate nitrogen which is re-pumped into the PN/ED-SBR reactor performing in the anoxic mode, and its oxidized nitrogen is removed by endogenous denitrification. The device uses SBR and UASB two-stage reactors to achieve high-efficiency nitrogen removal of the middle and mature landfill leachate. The process has higher nitrogen removal stability and more reliable nitrogen removal means, which is suitable for advanced nitrogen removal treatment of high-ammonia nitrogen wastewater such as landfill leachate.

The method for treating middle and mature landfill leachate by endogenous denitrification combined autotrophic nitrogen removal process according to the present application has the following advantages:

(1) the application organically combines partial nitrification, anammox and endogenous denitrification through the PN/ED-SBR and AMOX-UASB two-stage reactors, and realizes the high-efficiency and advanced nitrogen removal of the middle and mature landfill leachate;

(2) in the PN/ED-SBR, the endogenous denitrification bacteria in the anaerobic stage temporarily store the external carbon source in the raw water as an intracellular carbon source, and use the intracellular carbon source to perform endogenous denitrification in the anoxic stage to achieve nitrogen removal. Under the condition of 0 external carbon source and limited raw water carbon source, the raw water carbon source can be efficiently used to achieve the effect of nitrogen removal of the middle landfill leachate denitrification;

(3) in the PN/ED-SBR, the partial nitrification of ammonia oxidization bacteria can save 60% of aeration volume compared with traditional nitrification, greatly reducing operating energy consumption, and anammox does not produce greenhouse gases in the AMOX-UASB, and the process is more energy-saving and environmentally friendly;

(4) the two-stage reactors of PN/ED-SBR and AMOX-UASB make the advantages of functional bacteria in the respective reactors more obvious, easy to cultivate, and the whole process has more reliable stability and controllability;

(5) in this application, the total nitrogen load of the system is first reduced by anammox, and then a small amount of nitrate nitrogen produced by anammox is removed by endogenous denitrification, which makes the nitrogen removal efficiency of the system higher and the nitrogen removal means more reliable.

BRIEF DESCRIPTION OF THE DRAWINGS

FIG. 1 is a flow chart of a method for or treating middle and mature landfill leachate by endogenous denitrification combined autotrophic nitrogen removal process.

DETAILED DESCRIPTION

The present application will be further described in detail below combined with drawings and embodiments.

As shown in FIG. 1, a method for treating middle and mature landfill leachate by endogenous denitrification combined autotrophic nitrogen removal process, comprising a raw water tank (1), a partial nitrification and endogenous denitrification sequencing batch reactor (PN/ED-SBR) (2), a middle water tank (3), and an anammox reactor (AMOX-UASB) (4);

wherein the raw water tank is provided with a first water inlet (1.1), a first water outlet (1.2), a second water outlet (1.3), a first water inlet peristaltic pump (1.4), and a second water inlet peristaltic pump (1.5); the PN/ED-SBR (2) is provided with a pH/DO real-time monitoring device (2.1), a third water outlet (2.2), a second water inlet (2.3), a mixer (2.4), an aeration plate (2.5), a third water inlet (2.6), and a fourth water outlet (2.7); the middle water tank (3) is provided with a first middle water tank (3.1), a fourth water inlet (3.2), a fifth water outlet (3.3), a third water inlet peristaltic pump (3.4), a second middle water tank (3.5), a fifth water inlet (3.6), a sixth water outlet (3.7), and a fourth water inlet peristaltic pump (3.8); the AMOX-UASB (4) is provided with an exhaust port (4.1), a seventh water outlet (4.2), an overflow weir (4.3), a three-phase separator (4.4), a return port (4.5), a return peristaltic pump (4.6), and a sixth inlet nozzle (4.7);

wherein the first water outlet (1.2) of the raw water tank (1) is connected to the sixth water inlet (4.7) of AMOX-UASB (4) through the second water inlet peristaltic pump (1.5); the second water outlet (1.3) of the raw water tank (1) is connected to the second water inlet (2.3) of PN/ED-SBR (2) through the first water inlet peristaltic pump (1.4); the fourth water outlet (2.7) of PN/ED-SBR (2) is connected to the fourth water inlet (3.2) of the first middle water tank (3.1); the fifth water outlet (3.3) of the first middle water tank (3.1) is connected to the sixth water inlet (4.7) of the AMOX-UASB (4) through the third water inlet peristaltic pump (3.4); the return port (4.5) of the AMOX-UASB (4) is connected to the sixth water inlet (4.7) through the return peristaltic pump (4.6); the AMOX-UASB (4) is connected to the fifth water inlet (3.6) of the second middle tank (3.5); the sixth water outlet (3.7) of the second middle water tank (3.5) is connected to the third water inlet (2.6) of the PN/ED-SBR (2) through the fourth water inlet peristaltic pump (3.8).

The specific process is as follows:

1) adding partial nitrification activated sludge and endogenous denitrification activated sludge into the PN/ED-SBR (2) with a mass ratio of 1:2, and adding an anammox sludge into the anammox reactor (AMOX-UASB) (4), wherein the concentration of the mixed liquid sludge in the two reactors after the addition is controlled at 4000-6000 mg/L and 8000-15000 mg/L respectively;

2) turning on the first water inlet peristaltic pump (1.4), and pumping the middle and mature landfill leachate in the raw water tank (1) into the PN/ED-SBR (2) which is performed in A/O (anaerobic/aerobic) mode comprising after water inflow is completed, turning on the mixer (2.4) for entering an anaerobic stage, endogenous denitrification bacteria absorb exogenous organic matter in raw water and store it in cells as an internal carbon source, mixing for 4 h, and closing the mixer (2.4); and then starting aeration through the aeration plate (2.5), monitoring changes of DO and pH through the pH/DO real-time control device (2.1), controlling DO between 1.5-2.5 mg/L, and stopping aeration before an inflection point of a curve that shows the pH in the reactor during the nitrification process firstly descends and then rises, that is, "ammonia valley point"; performing sedimentation 1 h to separate a muddy water, opening the fourth water outlet (2.7), and draining the water into the first middle tank (3.1) with a drainage ratio of 70%;

3) turning on the second water inlet peristaltic pump (1.5) and the third water inlet peristaltic pump (3.4) respectively, and pumping the middle and mature landfill leachate in the raw water tank (1) and wastewater containing nitrite nitrogen in the first middle water tank (3.1) into the AMOX-UASB (4) at the same time to perform an anammox reaction; wastewater of the AMOX-UASB (4) enters the sixth water inlet (4.7) from the return port (4.5) through the return peristaltic pump (4.6) with a return ratio of 200%; and an effluent of the AMOX-UASB (4) enters the second middle water tank (3.5);

4) turning on the fourth water inlet peristaltic pump (3.8), re-pumping the wastewater containing nitrite nitrogen of the second middle water tank (3.5) into the PN/ED-SBR (2), turning on the mixer (2.4) for entering an anoxic stage, and performing internal source denitrification to remove nitrogen, mixing for 6 h, after anoxic stage, closing the mixer (2.4) for precipitation for 0.5 h to separate the muddy water, opening the third outlet (2.2), and discharging the treated wastewater with a drainage ratio of 10%.

The continuous test results show that:

after the process runs stably, under the condition that the influent ammonia nitrogen, total nitrogen and COD concentration are 1350±45 mg/L, 1425±60 mg/L and 2600±150 mg/L respectively, the effluent TN<65 mg/L, the removal rate reaches 95.5%, the TN removal load reaches 0.73 kg/(m³·d).

What is claimed is:

1. An apparatus for treating middle and mature landfill leachate by endogenous denitrification combined autotrophic nitrogen removal process, comprising a raw water tank, a partial nitrification and endogenous denitrification sequencing batch reactor (PN/ED-SBR), a middle water tank, and an anaerobic ammonium oxidation upflow anaerobic sludge blanket (AMOX-UASB) reactor, wherein the raw water tank is provided with a first water inlet, a first water outlet, a second water outlet, a first water inlet peristaltic pump, and a second water inlet peristaltic pump; the PN/ED-SBR is provided with a pH/DO real-time monitoring device, a third water outlet, a second water inlet, a mixer, an aeration plate, a third water inlet, and a fourth water outlet; the middle water tank is provided with a first middle water tank, a fourth water outlet, a fifth water inlet, a third water inlet peristaltic pump, a second middle water tank, a fifth water inlet, a sixth water outlet, and a fourth water inlet peristaltic pump; the AMOX-UASB is provided with an exhaust port, a seventh water outlet, an overflow weir, a three-phase separator, a return port, a return peristaltic pump, and a sixth inlet nozzle, and wherein the first water outlet of the raw water tank is connected to the sixth water inlet of AMOX-UASB through the second water inlet peristaltic pump, the second water outlet of the raw water tank is connected to the second water inlet of PN/ED-SBR through the first water inlet peristaltic pump, the fourth water outlet of PN/ED-SBR is connected to the fourth water inlet of the first middle water tank, the fifth water outlet of the first middle water tank is connected to the sixth water inlet of the AMOX-UASB through the third water inlet peristaltic pump, the return port of the AMOX-UASB is connected to the sixth water inlet through the return peristaltic pump, the AMOX-UASB is connected to the fifth water inlet of the second middle water tank, and the sixth water outlet of the second middle water tank is connected to the third water inlet of the PN/ED-SBR through the fourth water inlet peristaltic pump.

2. A method for treating middle and mature landfill leachate using the apparatus of claim 1, comprising the following processes:

1) adding partial nitrification activated sludge and endogenous denitrification activated sludge into the partial nitrification and endogenous denitrification integrated reactor (PN/ED-SBR) with a mass ratio of 1:2, and adding an anammox sludge into the anammox reactor (AMOX-UASB), wherein the concentration of the mixed liquid sludge in the two reactors after the addition is controlled at 4000-6000 mg/L and 8000-15000 mg/L respectively;

2) turning on the first water inlet peristaltic pump, and pumping the middle and mature landfill leachate in the raw water tank into the PN/ED-SBR which is performed in A/O (anaerobic/aerobic) mode comprising after water inflow is completed, turning on the mixer for entering an anaerobic stage, endogenous denitrification bacteria absorb exogenous organic matter in raw water and store it in cells as an internal carbon source, mixing for 4 h, and closing the mixer; and then starting aeration through the aeration plate, monitoring changes of DO and pH through the pH/DO real-time monitoring device, controlling DO between 1.5-2.5 mg/L, and stopping aeration at "ammonia valley point" which is an inflection point of a curve that shows the pH in the reactor during the nitrification process firstly descends and then rises; performing sedimentation 1 h to separate a muddy water to produce wastewater containing nitrite nitrogen, opening the fourth water outlet, and draining the wastewater containing nitrite nitrogen into the first middle tank with a drainage ratio of 70%;

3) turning on the second water inlet peristaltic pump and the third water inlet peristaltic pump respectively, and pumping the middle and mature landfill leachate in the raw water tank and wastewater containing nitrite nitrogen in the first middle water tank into the AMOX-UASB at the same time to perform an anammox reaction to produce wastewater containing nitrate nitrogen; the wastewater containing nitrate nitrogen produced from the AMOX-UASB enters the sixth water inlet from the return port through the return peristaltic pump with a return ratio of 200%; and the wastewater containing nitrate nitrogen produced from the AMOX-UASB enters the second middle water tank; and 4) turning on the fourth water inlet peristaltic pump, re-pumping the wastewater containing nitrate nitrogen of in the second middle water tank into the PN/ED-SBR, turning on the mixer for entering an anoxic stage, and performing internal source denitrification to remove nitrogen, mixing for 6 h, after anoxic stage, closing the mixer for precipitation for 0.5 h to separate a muddy water to produce treated wastewater, opening the third outlet, and discharging the treated wastewater with a drainage ratio of 10%.

* * * * *